(12) United States Patent
Iwashita et al.

(10) Patent No.: US 6,383,530 B1
(45) Date of Patent: *May 7, 2002

(54) METHOD FOR THE PRE-BAKING TREATMENT OF SHAPED AND FROZEN BREAD DOUGH

(75) Inventors: Yushi Iwashita; Naoko Shirai, both of Shimada; Yoshiji Adachi, Kawasaki, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,845

(22) Filed: Sep. 8, 2000

(30) Foreign Application Priority Data

Sep. 10, 1999 (JP) ............................................. 11-258031

(51) Int. Cl.⁷ ................................................. A21D 8/02
(52) U.S. Cl. ................................ 426/19; 426/8; 426/27; 426/61; 426/62; 426/128; 426/393; 426/524
(58) Field of Search ............................ 426/524, 27, 19, 426/393, 128, 8, 61, 62

(56) References Cited

U.S. PATENT DOCUMENTS 3,166,426 A * 1/1965 Matz et al. .................. 426/393
3,436,228 A * 4/1969 Lind ............................ 426/524
3,436,232 A * 4/1969 Taylor et al. .................... 426/8
5,084,284 A * 1/1992 McDilda et al. ............. 426/128
5,580,591 A * 12/1996 Cooley et al. ............... 426/128

FOREIGN PATENT DOCUMENTS

JP 07-079690 3/1995
JP 07-155100 6/1995

OTHER PUBLICATIONS

Baking Science & Technology, pp. 731–737, 1988.*

* cited by examiner

Primary Examiner—Lien Tran
(74) Attorney, Agent, or Firm—Oblon, Spivak, McClelland, Maier & Neustadt, P.C.

(57) ABSTRACT

A method for pre-baking treatment of shaped and frozen bread dough includes placing the shaped and frozen bread dough in a container and raising an inner temperature of the container to a range of 17° C. to 40° C. at a raising rate of 0.1° C./min to 2° C./min to thaw and finally proof the shaped and frozen bread dough continuously. The inner temperature of the container is lowered to a range of −20° C. to 15° C. at a lowering rate of 0.2° C./min to 0.7° C./min after finally proofing the shaped and frozen bread dough. A temperature difference between a dew point of air inside the container and a surface temperature of the bread dough is controlled to be within 20° C. during the raising and lowering steps.

10 Claims, No Drawings

METHOD FOR THE PRE-BAKING TREATMENT OF SHAPED AND FROZEN BREAD DOUGH

TECHNICAL FIELD

The invention relates to a method for the pre-baking treatment of shaped and frozen bread dough.

BACKGROUND ART

Shaped and frozen bread dough is usually taken out from a freezer or a refrigerated warehouse, and thawed out in a room(a room temperature method) or in a proofer (a thawing and proofing method). After the completion of thawing, dough with a temperature of between 0° C.~20° C. is put in a proofer for a final proofing process.

Recently, a thawing method using a retarder is adopted for relieving workers of their early morning shift, in which the thawing process is carried out for 6~24 hours at a temperature range of 0° C.~5° C. Further, a dough conditioner is now used in which the retarder is equipped with a computer system, enabling a continuous and automated processes of thawing and final proofing.

Japanese Patent Publication Hei.6-36707 discloses a thawing method, comprising heating shaped and frozen bread dough for 2~6 hours up to a temperature of 10° C. at an average temperature-raising rate of 0.07~0.28° C. /min and a relative humidity of 70~100%, and further keeping it for 10 min~6 hours at a temperature of 10° C.~20° C. and a relative humidity of 70~100%.

Japanese Patent Application Laid Open Hei.5-64539 discloses a bread-making method, comprising thawing with retardation frozen bread dough for 10 min~72 ours at a temperature of −5~10° C. /min, a relative humidity of 90~100% and ventilation rate of 0.2 m/s or less, pre-heating it for one hour and 20 min ~2 hours and 10 min up to a temperature of 15~20° C., heating it for 20 min~one hours and 10 min up to a temperature of 22~40° C., keeping it for 20 min~3 hours at the same temperature, and then baking the bread dough.

Japanese Patent Application Laid Open Hei.7-155100 discloses a method of keeping bread in a suitable condition for baking for a long period of time, comprising keeping the bread at a temperature of 0~18° C. after final proofing in order to inhibit the activity of bakers' yeast.

Japanese Patent No. 2729669 discloses a method for the pre-baking treatment of frozen bread dough comprising adjusting a thawing condition for each of different kinds of bread that need different time for their final proofing, so that their final proofing may be done simultaneously.

The purpose of the present invention is first to simplify complicated pre-baking work, secondly to standardize the pre-baking work of various kinds of bread dough in order to simultaneously carry out their pre-baking, and finally to increase baking frequency of bread dough.

By utilizing shaped and frozen bread dough, it will be possible to simplify the work in a bakery and to significantly reduce the workload, when compared with a conventional scratch baking method wherein all the processes from mixing to baking are continuously in store. Without a professional baker or artisan having a specialized technique, it would be therefore possible to make bread.

However, even if the shaped and frozen bread dough is used at a usual bakery where 60~100 kinds of bread are made, they can not be produced more than twice per day so that freshly baked bread can hardly be always provided to customers all the day.

The reasons for that may be as follows, for example:
First, since the conventional thawing methods need plenty of time, it would be very hard to be carry out several times in a day; second, since each kind of bread items needs different time for their thawing and final proofing processes, an individual treatment will be required for each kind of bread. As a result, the number of the working processes and working frequency will be increased and working processes will be more complicated as the number of the bread items are increased; and the finally proofed bread dough has to be baked immediately.

It is therefore desirable to simplify the working for bread making by continuously carrying out thawing and final proofing processes, and keeping the finally proofed bread dough for a certain period of time so that baking can be done at any time.

DISCLOSURE OF THE INVENTION

The present invention relates to a method for the pre-baking treatment of shaped and frozen bread dough, comprising is continuously carrying out a thawing process and a final proofing process of the shaped and frozen bread dough in a container while keeping its inner temperature at a range of 17~40° C., preferably of 22~35° C. and its inner relative humidity at a range of 50~75%, preferably of 60~65%, and after the completion of the final proofing, putting the bread dough in another container with its inner temperature at a range of −20~15° C. and its inner relative humidity of 80% or more so that the condition of the bread dough may be maintained.

The present invention is also related to a method for the pre-baking treatment of shaped and frozen bread dough, comprising continuously carrying out a thawing process and a final proofing process of the shaped and frozen bread dough in a container while keeping its inner temperature at a range of 17~40° C., preferably of 22~35° C. and its inner relative humidity at a range of 50~75%, preferably of 60~65%, and after the completion of the final proofing, lowering its inner temperature to a range of −20~15° C., preferably of 0~10° C. at a lowering rate of 0.2° C./min or more, preferably 0.4° C./min or more while controlling the difference between a dew point in the container and a temperature on the bread surface within 20° C. or less, preferably 15° C. or less more so that the condition of the bread dough may be maintained.

According to the present invention, it is possible to continuously carry out the thawing and final proofing processes of the shaped and frozen bread dough by putting the bread dough in a container whose inner temperature and relative humidity have already been set at desired ranges without necessity of any further change of its temperature or relative humidity thereafter.

An "inner relative humidity" means that of air in the container and is an average value subjected to fluctuation at a range of about ±10%. According to the present invention, the temperature or relative humidity in the container is not necessarily kept at a constant level, as long as they are kept at the above ranges.

Alternatively, the continuous processes of thawing and final proofing of the present invention may be carried out by raising its inner temperature to a range of 17~40° C., preferably of 22~35° C. at a raising rate of 0.1~2° C./min, preferably 0.3~1° C./min while controlling the difference between a dew point in the container and a temperature on the bread surface within 20° C. or less, preferably 15° C. or less.

In the above case, it is not necessary to keep the container with its inner temperature at a range of 17~40° C., or to control the difference between a dew point in the container and a temperature of the bread surface within 20° C. or less at the time of putting the bread dough in it. Thus, the bread may be put in the container with its inner temperature at a range of −20~15° C. and the difference of 20° C. or more between a dew point in the container and a temperature of the bread surface.

According to the present invention, the bread dough that is ready for baking can be made within about 2~4 hours from the starting of thawing through the continuous processes of thawing and final proofing in the same container.

The raising rate is not necessarily kept at the same level during the raising period, but may be varied within the above range. Thus, the raising rate may change continuously or gradually. Further, after the temperature in the container has been raised to a certain level, it may be kept within the above range to continue the final proofing process.

Conventional thawing processes under a high temperature have disadvantages of the occurrence of dampness on the bread surface during the thawing process and irregularity in thawing.

According to the present invention, however, it is possible to inhibit the generation of dampness on the bread surface during the thawing process by keeping a relative humidity at a range of 50~75% in the container or by controlling the difference between a dew point in the container and a temperature on the bread surface within 20° C. or less. And a high raising rate of the temperature according to the present invention can rapidly heat the center of the bread dough, especially in a small piece of the shaped and frozen dough, reducing the difference in the activity of bakers' yeast between in the center and on the surface of the bread dough so that the above problem of irregularity in thawing is improved to give bread with an excellent quality.

It is known in the art that white spots named "a fish eye" will appear on the surface of the baked bread if it has been kept at a temperature of 0~15° C. for a long time. Such fish eyes may often be also observed after thawing of the shaped and frozen bread dough.

However, a rapid thawing within such a short period of time as a few hours according to the present invention does not show the above phenomena so that the surface of the bread will be in an excellent condition.

Further, according to the present invention, it is possible to rapidly inhibit the activity of bakers' yeast in the bread by putting the bread dough to another container with its inner temperature at a range of −20~15° C. and its inner relative humidity of 80% or more after the completion of the final proofing, or by lowering the inner temperature to a range of −20~15° C., preferably of 0~10° C. at a lowering rate of 0.2° C./min or more, preferably 0.4° C./min or more while controlling the difference between a dew point in the same container and a temperature on the bread surface within 20° C. or less.

As a result, it is possible to minimize the change in the condition of the bread, especially that in its volume, so that the bread dough may be maintained in an excellent condition after the final proofing for a long time without showing any dryness on its surface.

The lowering rate is not necessarily kept at the same level during the lowering period, but may be varied within the above range. Thus, the lowering rate may change continuously or gradually.

The difference between a dew point in the container and a temperature of the bread surface according to the present invention is an average value and subjected to fluctuation at a range of about ±10%.

The above difference may be determined by any method known to those skilled in the art. For example, the dew point of air may be obtained from a psychrometric chart that shows a relationship between a temperature and humidity, and the temperature on the bread surface may be actually measured by means of a known temperature sensor.

An apparatus which may be used in the present invention for thawing, final proofing, and keeping the bread dough under cooling after the final proofing is generally called a "dough conditioner," in which heating, cooling, humidifying, and dehumidifying may be optionally done. Especially, it is desirable to use a dough conditioner having a cooling power of more than 400 W, preferably more than 600 W and a heating power of more than 600 W, preferably more than 1 KW per 20 Kg of frozen bread dough. Any other type of dough conditioners known in the art may be used in the present invention.

Further, the present invention is related to a method for the pre-baking treatment of shaped and frozen bread dough, characterized in that an amount of bakers' yeast to be added to each piece of a plural kind of the shaped and frozen bread dough is adjusted so that a total time of the thawing and final proofing processes for each of the above bread dough may be uniformed.

It is known that the composition of bread dough varies very much depending on a kind of the bread. Even if the same amount of bakers' yeast is added, the degree of the activity of the bakers' yeast will be significantly influenced by the composition, especially by the content of salt and sugars, and an amount of generated $CO_2$ gas (or a $CO_2$ generating rate) will vary in a great degree.

An optimum dough-swelling rate in the final proofing process, in other words, an optimum amount of the generated $CO_2$ gas is different depending on a kind of the bread. Furthermore, the thawing rate is different depending on the shape or amount of divided bread dough.

According to the present invention, an amount of the generated $CO_2$ gas is measured for each kind of the bread dough by means of a fermograph in order to calculate an amount of the bakers' yeast that will generate a necessary amount of $CO_2$ gas in a certain period of time. Based on the calculated values, an amount of the bakers' yeast to be added is adjusted for each kind of the shaped and frozen bread dough so that a total time of thawing and final proofing for each piece of the plural kind of the bread dough may be uniformed.

There is no limitation with respect to materials used for the present shaped and frozen bread dough and their content ratios. For example, those skilled in the art may optionally select them depending on the kind of final products including sweetened buns such as bean-filled ones and butter roll.

Starting bread dough prepared by optionally mixing various materials may be subjected to well known processes such as pre-treatment, mixing, kneading, and proofing, then dividing, rounding, dry-proofing, molding, and shaping, followed by freezing by means of a freezer such as an "air blast freezer" and keeping in the freezer and the like at an appropriate temperature.

The shape of the frozen bread dough may be optionally selected by those skilled in the art depending on the kind of the final products.

BEST MODE FOR CARRYING OUT THE INVENTION

The present invention will be further described in more detail, with reference to the following examples which, however, should not be construed to limit the scope of the present invention in any sense.

"Bakers' %" and "%" on the following Tables mean "Parts by weight," as are well known and obvious to those skilled in the art.

EXAMPLE 1

Shaped and frozen bread dough was prepared in a manner summarized in Table 1

[TABLE 1]

Composition and Processes

Unit: Bakers' %

| Composition of Final Dough | Sweetened Buns | Topped and Baked Buns | Butter Rolls | Danish Pastries |
|---|---|---|---|---|
| Wheat Flour | 100% | 100% | 100% | 100% |
| Salt | 1.5 | 1.7 | 1.5 | 1.5 |
| Sugar | 25 | 10 | 12 | 15 |
| Nonfat Milk Powder | 3 | — | 3 | — |
| Butter | — | — | 15 | — |
| Compound Margarine | 8 | 6 | — | 10 |
| Whole Egg | 10 | — | 15 | 10 |
| Anti-Freezing Yeast Frozen | 6 | 5 | 4 | 3 |
| Dough Modifier | 1 | 1 | 1 | 1 |
| Water | 52 | 63 | 50 | 44 |
| Proofed Dough | 114 | 114 | 114 | — |
| Inserted Fat | — | — | — | 25% |
| Condition of Final Proofing | | 22° C., 20 min | | |
| Weight of a Divided Piece | 90 g | 90 g | 40 g | 50 g |
| Condition for Freezing | | −30° C., 30 min | | |

The Shaped and frozen bread dough prepared in the above manner was taken out from a freezer, placed on a plate (pan) and put in a dough conditioner controlled at its inner temperature of 5° C. and its inner relative humidity of 90%. The temperature in the dough conditioner was then raised to 30° C. at a raising rate of 0.5° C./min for 50 min and kept at the same temperature for 100 min. The relative humidity in the conditioner was kept at 65±10% during these processes. Then the temperature in the conditioner was lowered to 5° C. at a lowering rate of 0.7° C./min for 35 min and kept at the same temperature for 60 min. Through all the above processes, the air in the conditioner was appropriately humidified and dehumidified in order to control the difference between a dew point in the container and a temperature on the bread surface within 15° C. or less. The bread dough was then baked in an oven.

EXAMPLE 2

The shaped and frozen bread dough was prepared in the same manner as in EXAMPLE 1, placed on a plate (pan), and put in a dough conditioner controlled at its inner temperature of 30° C. and its inner relative humidity of 60% and kept for 150 min. Upon the completion of thawing and final proofing of the shaped and frozen bread dough, it was put in another dough conditioner controlled at its inner temperature of 5° C. and its inner relative humidity of 90% and kept for 60 min. The bread dough was then baked in the oven.

EXAMPLE 3

The shaped and frozen bread dough was prepared in the same manner as in EXAMPLE 1, placed on a plate (pan), and put in a dough conditioner controlled at its inner temperature of 30° C. and its inner relative humidity of 60% and kept for 130 min. The temperature in the dough conditioner was then lowered to 5° C. at a lowering rate of 0.7° C./min for 35 min and kept at the same temperature for 60 min. Through all the above processes, the air in the conditioner was appropriately humidified and dehumidified in order to control the difference between a dew point in the container and a temperature on the bread surface within 15° C. or less. The bread dough was then baked in the oven.

COMPARATIVE EXAMPLE 1

The shaped and frozen bread dough was prepared in the same manner as in EXAMPLE 1 except the content of the yeast added in the final dough, followed by the same thawing, final proofing and cooling processes as in EXAMPLE 1. The results obtained are shown in Table 2.

[TABLE 2]

Amount of generated $CO_2$ gas during the thawing process

| Amount of Yeast | 3% | | 4% | | 5% | |
|---|---|---|---|---|---|---|
| Thawing Time | 120 min | 150 min | 120 min | 150 min | 120 min | 150 min |
| Sweetened Buns | 2.7 | 3.6 | 3.2 | 4.3 | 3.5 | 4.6 |
| Topped and Baked Buns | 4.8 | 6.3 | 5.3 | 6.9 | 5.8 | 7.5 |
| Butter Rolls | 3.6 | 5.0 | 4.3 | 5.8 | 4.8 | 6.4 |
| Danish Pastries | 2.3 | 3.1 | 2.9 | 4.0 | 3.5 | 4.9 |

Unit: ml/g (the amount of generated $CO_2$ gas per 1 g of the dough)

The above results confirmed that if the contents of the other materials than the yeast were different the amount of the generated gas would also show different values. The amount of the generated gas was determined by means of a fermograph (manufactured by ATO Co. in Japan).

Volume of the bread dough containing 4% of the yeast that was obtained by final proofing was suitable for topped and baked buns, but too large for butter rolls and Danish pastries or too small for sweetened buns.

Thus, by changing an amount of the yeast to be added, the amount of the generated gas can be reduced to control the volume of the dough after the final proofing. Since an optimum amount of the generated gas depends on the kind and shape of the dough, the same amount of the generated gas will not be necessarily required to uniform a total time for thawing and final proofing of each piece of the above bread dough. But, it is necessary to use an amount of the yeast that will generate the optimum amount of the gas for each kind of bread dough.

COMPARATIVE EXAMPLE 2

The shaped and frozen bread dough was prepared in the same manner as in EXAMPLE 1. It was taken out from a freezer, placed on a plate (pan), put in a dough conditioner controlled at its inner temperature of 5° C. and its inner relative humidity of 80% and kept for 16 hours to thaw the dough completely. After having kept the conditioner for 2 hours at its inner temperature of 20° C. and its inner relative humidity of 80%, the dough conditioner was set at its inner temperature of 30° C. and its inner relative humidity of 80% and kept for 60 min. Then the temperature in the conditioner was lowered to 5° C. at a lowering rate of 0.7° C./min for 35 min and kept at the same temperature and inner relative humidity of 90% for 60 min. The bread dough was then baked in the oven.

COMPARATIVE EXAMPLE 3

The shaped and frozen bread dough was prepared in the same as in EXAMPLE 1. It was taken out from a freezer, placed on a plate (pan) and put in a dough conditioner controlled at its inner temperature of 5° C. and inner relative humidity of 80%. The temperature in the dough conditioner was then raised to 30° C. at a raising rate of 0.5° C./min for 50 min and kept at the same temperature for 100 min . The relative humidity in the conditioner was kept at 80±10% during these processes. The difference between a dew point in the container and a temperature on the bread surface was 27° C. in an early stage of the raising period. Then the temperature in the conditioner was lowered to 5° C. at a lowering rate of 0.7° C./min for 35 min and kept at the same temperature for 60 min. The difference between a dew point in the container and a temperature on the bread surface was controlled within 20° C. or less. The bread dough was then baked in the oven.

COMPARATIVE EXAMPLE 4

The shaped and frozen bread dough was prepared in the same as in EXAMPLE 1. It was taken out from a freezer, placed on a plate (pan) and put in a dough conditioner controlled at its inner temperature of 5° C. and inner relative humidity of 80%. The temperature in the dough conditioner was then raised to 30° C. at a raising rate of 0.5° C./min for 50 min and kept at the same temperature for 100 min. The relative humidity in the conditioner was kept at 65±10% during these processes. The difference between a dew point in the container and a temperature on the bread surface was kept within 20° C. or less. Then the temperature in the conditioner was lowered to 5° C. at a lowering rate of 0.1° C./min for 4 hours and kept at the same temperature for 60 min. The difference between a dew point in the container and a temperature on the bread surface was controlled within 20° C. or less. The bread dough was then baked in the oven.

The results obtained in the above Examples and Comparative Examples are summarized in Table 3 below.

[TABLE 3]

|  | Condition of Dough before Baking | Evaluation of the Quality of Product |
|---|---|---|
| EXAMPLE 1 | O Excellent in all Items | O Excellent in all Items |
| EXAMPLE 2 | O Excellent in all Items | O Excellent in all Items |
| EXAMPLE 3 | O Excellent in all Items | O Excellent in all Items |
| COMPARATIVE 1 | X Irregular in the Condition after Final Proofing | X Under-volume or Over-volume |
| COMPARATIVE 2 | X Too damp on the Surface | X Occurrence of Spot Pattern (Eye fishes) |
| COMPARATIVE 3 | X Too damp on the Surface | X Rough on the Bread Surface |
| COMPARATIVE 4 | X Irregular in the Condition after Final Proofing | X Flat on the whole and Loss of Shape |

The condition of the bread dough before baking process in the EXAMPLEs was more excellent and the quality of their bread products obtained after baking was also more excellent than those in the COMPARATIVE EXAMPLEs.

It has been revealed that the range of the relative humidity in the thawing and final proofing processes of the shaped and frozen bread dough is important. Thus, if the surface of shaped dough is too dry or damp, an outer surface of the baked bread will be adversely affected. It is therefore essential to keep the surface of the bread dough always in an appropriately moist condition.

Furthermore, it has been also found that it is important to rapidly raise or lower the temperature in the container. Thus, it has been revealed that if the above raising or lowering rate is too slow, it will not only adversely affect the quality of the product, but also cause some problems such as over-proofing, so that an excellent quality of the bread products can not be constantly obtained.

ADVANTAGES OF THE INVENTION

Since the pre-baking treatment of the present invention may be completed in about 2~4 hours from the starting of thawing to the final proofing, it is possible to bake the bread more than twice per day and to control the number of the baked final products considering the sales circumstances. If a plural number of proofers are combined and used, the above advantages of the present invention may be more efficiently obtained.

Conventionally, in order to carry out the thawing, final-proofing, and keeping the dough condition after the final proofing of a plural kind of the shaped and frozen bred dough, it is necessary to treat individually each kind of the bread dough and to bake them in order of the completion of the thawing and final-proofing processes.

On the other hand, the thawing of a plural kind of the bread dough may be simultaneously started, and they may be baked in any order at any desired time.

According to the present invention, all of the processes may be done in the same container (e.g., dough conditioner), and the amount of the complicated workload such as moving of a plate(or pan) can be reduced. As a result, it has now become possible for few workers to bake many kinds of bread dough with a high frequency at any optional time without a highly specialized technique.

What is claimed is:

1. A method for pre-baking treatment of shaped and frozen bread dough, comprising:

placing the shaped and frozen bread dough in a container;

raising an inner temperature of the container to a range of 17° C. to 40° C. at a raising rate of 0.1° C./min to 2° C./min to thaw and finally proof the shaped and frozen bread dough continuously;

lowering the inner temperature of the container to a range of −20° C. to 15° C. at a lowering rate of 0.2° C./min to 0.7° C./min after finally proofing the shaped and frozen bread dough; and controlling a temperature difference between a dew point of air inside the container and a surface temperature of the bread dough to be within 20° C. during the raising and lowering steps.

2. A method for pre-baking treatment of shaped and frozen bread dough, comprising:

placing the shaped and frozen bread dough in a container;

raising an inner temperature of the container to a range of 20° C. to 40° C. at a raising rate of 0.3° C./min to 1° C./min to thaw and finally proof the shaped and frozen bread dough continuously;

lowering the inner temperature of the container to a range of −20° C. to 15° C. at a lowering rate of 0.2° C./min to 0.7° C./min after finally proofing the shaped and frozen bread dough; and controlling a temperature difference between a dew point of air inside the container and a surface temperature of the bread dough to be within 20° C. during the raising and lowering steps.

3. A method for pre-baking treatment of shaped and frozen bread dough, comprising:

placing the shaped and frozen bread dough in a container;

raising an inner temperature of the container to a range of 22° C. to 35° C. at a raising rate of 0.2° C./min to 2° C./min to thaw and finally proof the shaped and frozen bread dough continuously;

lowering the inner temperature of the container to a range of −20° C. to 15° C. at a lowering rate of 0.2° C./min to 0.7° C./min after finally proofing the shaped and frozen bread dough; and controlling a temperature difference between a dew point of air inside the container and a surface temperature of the bread dough to be within 20° C. during the raising and lowering steps.

4. A method for pre-baking treatment of shaped and frozen bread dough, comprising:

placing the shaped and frozen bread dough in a container;

raising an inner temperature of the container to a range of 22° C. to 35° C. at a raising rate of 0.3° C./min to 1° C./min to thaw and finally proof the shaped and frozen bread dough continuously;

lowering the inner temperature of the container to a range of −20° C. to 15° C. at a lowering rate of 0.2° C./min to 0.7° C./min after finally proofing the shaped and frozen bread dough; and controlling a temperature difference between a dew point of air inside the container and a surface temperature of the bread dough to be within 20° C. during the raising and lowering steps.

5. A method for pre-baking treatment of shaped and frozen bread dough, comprising:

placing the shaped and frozen bread dough in a container;

raising an inner temperature of the container to a range of 22° C. to 35° C. at a raising rate of 0.3° C./min to 1° C./min to thaw and finally proof the shaped and frozen bread dough continuously;

lowering the inner temperature of the container to a range of −20° C. to 15° C. at a lowering rate of 0.4° C./min to 0.7° C./min after finally proofing the shaped and frozen bread dough; and controlling a temperature difference between a dew point of air inside the container and a surface temperature of the bread dough to be within 20° C. during the raising and lowering steps.

6. A method for pre-baking treatment of shaped and frozen bread dough according to claim 1, further comprising:

adjusting an amount of bakers' yeast to be added to the shaped and frozen bread dough so that a total time to thaw and finally proof the shaped and frozen bread dough is substantially constant among different kinds of bread dough.

7. A method for pre-baking treatment of shaped and frozen bread dough according to claim 2, further comprising:

adjusting an amount of bakers' yeast to be added to the shaped and frozen bread dough so that a total time to thaw and finally proof the shaped and frozen bread dough is substantially constant among different kinds of bread dough.

8. A method for pre-baking treatment of shaped and frozen bread dough according to claim 3, further comprising:

adjusting an amount of bakers' yeast to be added to the shaped and frozen bread dough so that a total time to thaw and finally proof the shaped and frozen bread dough is substantially constant among different kinds of bread dough.

9. A method for pre-baking treatment of shaped and frozen bread dough according to claim 4, further comprising:

adjusting an amount of bakers' yeast to be added to the shaped and frozen bread dough so that a total time to thaw and finally proof the shaped and frozen bread dough is substantially constant among different kinds of bread dough.

10. A method for pre-baking treatment of shaped and frozen bread dough according to claim 5, further comprising:

adjusting an amount of bakers' yeast to be added to the shaped and frozen bread dough so that a total time to thaw and finally proof the shaped and frozen bread dough is substantially constant among different kinds of bread dough.

* * * * *